United States Patent
Baba et al.

(10) Patent No.: US 10,790,669 B2
(45) Date of Patent: Sep. 29, 2020

(54) POWER SAVING CONTROL DEVICE AND POWER SAVING CONTROL METHOD

(71) Applicant: Panasonic Intellectual Property Management Co., Ltd., Osaka (JP)

(72) Inventors: Akira Baba, Tokyo (JP); Haruka Nakasone, Tokyo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 360 days.

(21) Appl. No.: 15/746,881

(22) PCT Filed: Jun. 30, 2016

(86) PCT No.: PCT/JP2016/003131
§ 371 (c)(1),
(2) Date: Jan. 23, 2018

(87) PCT Pub. No.: WO2017/017897
PCT Pub. Date: Feb. 2, 2017

(65) Prior Publication Data
US 2020/0106270 A1    Apr. 2, 2020

(30) Foreign Application Priority Data
Jul. 29, 2015    (JP) .................. 2015-149745

(51) Int. Cl.
*H02J 3/32* (2006.01)
*H02J 3/14* (2006.01)
*H02J 3/38* (2006.01)

(52) U.S. Cl.
CPC .................. *H02J 3/32* (2013.01); *H02J 3/14* (2013.01); *H02J 3/38* (2013.01)

(58) Field of Classification Search
CPC .................. H02J 3/32; H02J 3/38; H02J 3/14
(Continued)

(56) References Cited

U.S. PATENT DOCUMENTS 5,423,045 A * 6/1995 Kannan ............ G06F 1/30
365/229
6,222,709 B1 * 4/2001 Baba ............ H03K 17/0822
323/282

(Continued)

FOREIGN PATENT DOCUMENTS

GB    2519755 A    5/2015
JP    2008-067439 A    3/2008
(Continued)

OTHER PUBLICATIONS

Australian Examination Report issued in Application No. 2016300267 dated Aug. 24, 2018.
(Continued)

*Primary Examiner* — M Baye Diao
(74) *Attorney, Agent, or Firm* — McDermott Will & Emery LLP

(57) ABSTRACT

A power saving control device includes: an acquirer that acquires a power saving request; and a controller that determines whether or not power saving control for reducing a power consumption of a load device is to be performed in response to the power saving request, and that, when determining that the power saving control is to be performed, performs the power saving control. When the load device consumes power, the controller determines that the power saving control is not to be performed under a condition that no power flows from a power system into a facility in which the load device is installed, the condition being one of one or more conditions.

7 Claims, 10 Drawing Sheets

(58) Field of Classification Search
USPC ........................................................ 320/132
See application file for complete search history.

(56) References Cited

U.S. PATENT DOCUMENTS

| | | | | |
|---|---|---|---|---|
| 6,335,577 | B1* | 1/2002 | Baba ..................... | H02H 3/087 307/28 |
| 2005/0240756 | A1* | 10/2005 | Mayer ................... | G06F 9/4418 713/2 |
| 2010/0235008 | A1* | 9/2010 | Forbes, Jr. ............. | B60L 53/14 700/291 |
| 2012/0242293 | A1 | 9/2012 | Yumura et al. | |
| 2014/0046498 | A1* | 2/2014 | Nakayama ............. | H02J 3/381 700/295 |
| 2014/0312841 | A1* | 10/2014 | Baba ..................... | H02J 3/383 320/109 |
| 2018/0138731 | A1* | 5/2018 | Baba ..................... | G05B 15/02 |

FOREIGN PATENT DOCUMENTS

| | | |
|---|---|---|
| JP | 2008-104332 A | 5/2008 |
| JP | 2012-205430 A | 10/2012 |
| JP | 2013-230051 A | 11/2013 |
| JP | 2014-131478 A | 7/2014 |

OTHER PUBLICATIONS

International Search Report issued in Application No. PCT/JP2016/003131 dated Sep. 20, 2016, with English translation.

* cited by examiner

POWER SAVING CONTROL DEVICE AND POWER SAVING CONTROL METHOD

RELATED APPLICATIONS

This application is the U.S. National Phase under 35 U.S.C. § 371 of International Application No. PCT/JP2016/003131, filed on Jun. 30, 2016, which in turn claims the benefit of Japanese Application No. 2015-149745, filed on Jul. 29, 2015, the disclosures of which are incorporated herein by reference in their entirety.

TECHNICAL FIELD

The present invention relates to a power saving control device that performs power saving control based on a power saving request.

BACKGROUND ART

In the past, a system has been proposed that, when power supply and demand is in critical condition, reduces the power consumption of load device of consumer side (for instance, PTL 1).

CITATION LIST

Patent Literature

PTL1: Japanese Unexamined Patent Application Publication No. 2013-230051

SUMMARY OF THE INVENTION

Technical Problems

However, in some cases, discharge power of power storage devices of consumers are used for the power consumption of the load devices (load device) of the consumers. In such a case, even when the power consumption of the load devices is reduced for power saving, the discharge power of the power storage devices is only reduced, and the supply power of a power system is not reduced. Also, in such a case, since the power consumption of the load devices is reduced, application of the power storage devices may be obstructed. In addition, utilization of load devices may be unnecessarily obstructed.

It is to be noted that when the output power of other distributed power source devices not limited to power storage devices is used for the power consumption of the load devices, reduction in the power consumption of the load devices for power saving may be inappropriate.

Thus, it is an object of the present invention to provide a power saving control device capable of avoiding inappropriate execution of power saving control.

Solution to Problems

In order to achieve the above-mentioned object, a power saving control device according to an aspect of the present invention includes: an acquirer that acquires a power saving request; and a controller that determines whether or not power saving control for reducing a power consumption of a load device is to be performed in response to the power saving request, and that, when determining that the power saving control is to be performed, performs the power saving control. When the load device consumes power, the controller determines that the power saving control is not to be performed under a condition that no power flows from a power system into a facility in which the load device is installed, the condition being one of one or more conditions.

Also, a power saving control method according to an aspect of the present invention includes: acquiring a power saving request; and determining whether or not power saving control for reducing a power consumption of a load device is to be performed in response to the power saving request, and when it is determined that the power saving control is to be performed, performing the power saving control. In the determining, when the load device consumes power, it is determined that the power saving control is not to be performed under a condition that no power flows from a power system into a facility in which the load device is installed, the condition being one of one or more conditions.

Advantageous Effect of Invention

A power saving control device according to an aspect of the present invention can avoid inappropriate execution of power saving control.

DESCRIPTION OF EXEMPLARY EMBODIMENT (Underlying Knowledge Forming Basis of the Present Disclosure)

As described above in TECHNICAL PROBLEMS, the inventors have found that even when the power consumption of the load devices is reduced for power saving, the supply power of the power system may not be reduced. Hereinafter, a description will be specifically given using FIGS. 1 and 2.

Figure 1:
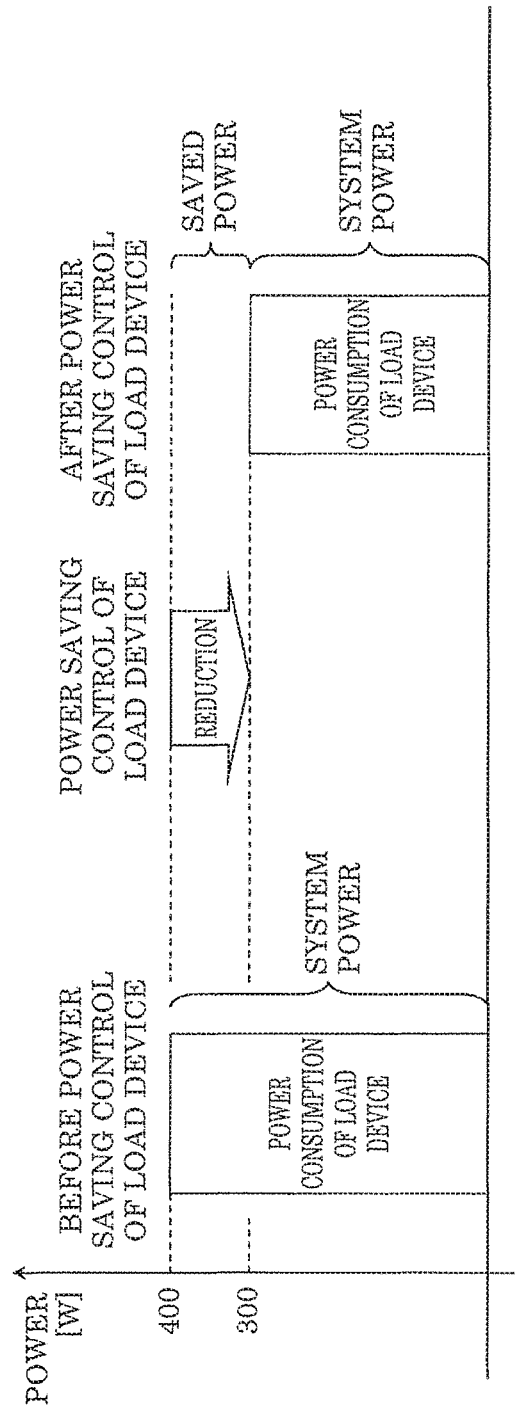
FIG. 1 is a conceptual diagram illustrating reduction in power consumption in a first reference example.

FIG. 1 is a conceptual diagram illustrating reduction in power consumption in a first reference example. As shown in FIG. 1, for instance, before the power saving control of a load device, the power consumption (demanded power) of the load device is 400 W. The power (system power) supplied from a power system is used for the power consumption of load device.

When power supply and demand is in critical condition, the power consumption of the load device is reduced by performing the power saving control on the load device. Specifically, when the load device is an air conditioner, the power consumption of the load device is reduced by stopping the air conditioner or setting the preset temperature of the air conditioner closer to the ambient temperature. For instance, after the power saving control of the load device, the power consumption of the load device is 300 W. In this case, the system power is reduced by 100 W.

Figure 2:
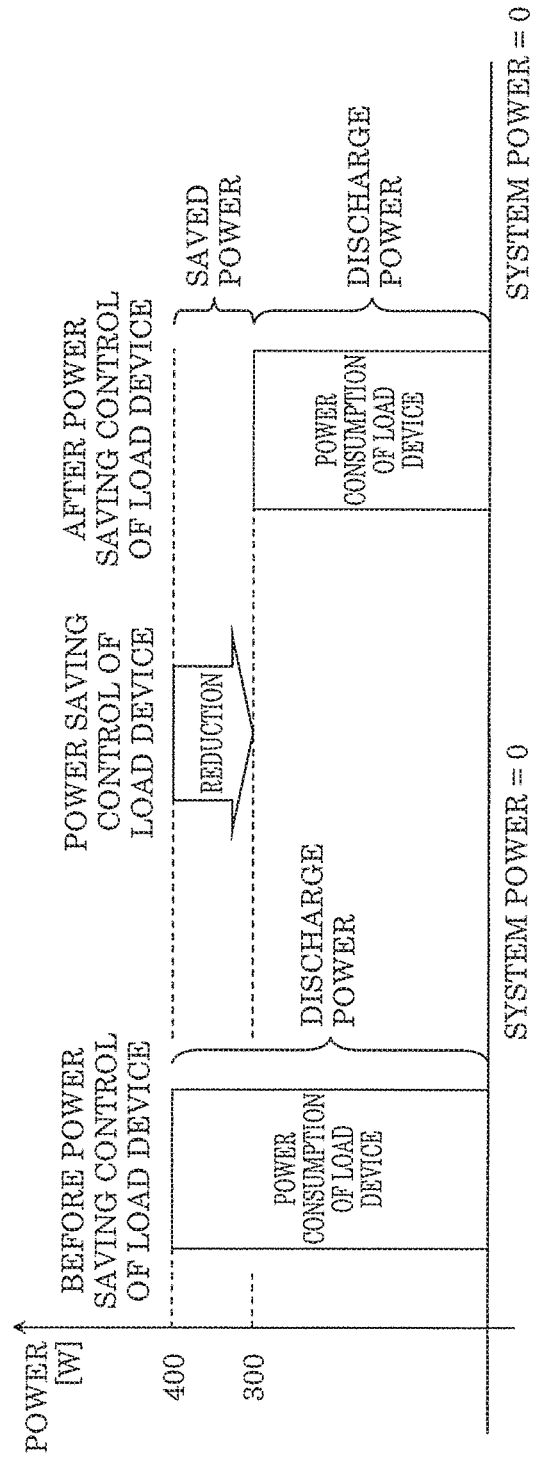
FIG. 2 is a conceptual diagram illustrating reduction in power consumption in a second reference example.

FIG. 2 is a conceptual diagram illustrating reduction in power consumption in a second reference example. Similarly to FIG. 1, before the power saving control of the load device, the power consumption of the load device is 400 W. In FIG. 2, the discharge power of the power storage device is used for the power consumption of the load device.

Similarly to the example of FIG. 1, the power consumption of the load device is reduced by performing the power saving control over the load device. Similarly to the example of FIG. 1, after the power saving control of the load device, the power consumption of the load device is 300 W. In this case, the discharge power of the power storage device is reduced by 100 W.

However, in the example of FIG. 2, the system power does not change and remains at 0 W In other words, even when the power saving control is performed on the load device, the system power is not reduced and the effect of the power saving is not achieved. In addition, effective use of the power accumulated in the power storage device is obstructed by performing the power saving control on the load device. Furthermore, although the effect of power saving is not achieved, utilization of the load device is also obstructed.

Thus, a power saving control device according to the embodiment of the invention avoids inappropriate execution of the power saving control.

Hereinafter, an embodiment of the invention will be described in detail using FIGS. 3 to 11. It is to be noted that the embodiment described below represents a general or specific example. The numerical values, shapes, materials, structural components, the arrangement and connection of the structural components, an order of operations shown in the following embodiments are mere examples, and are not intended to limit the scope of the present invention. In the following embodiment, the components thereof, which are not described in the independent claim that defines the most generic concept of the present invention, are regarded as any components.

Also, the power in the following description may indicate the value of the power. Also, the power in the following description may indicate an amount of power (energy) which is an integrated value of the power. Also, the charge/discharge in the following description is at least one of charge and discharge. Also, the input/output in the following description is at least one of input and output.

Embodiment

Figure 3:
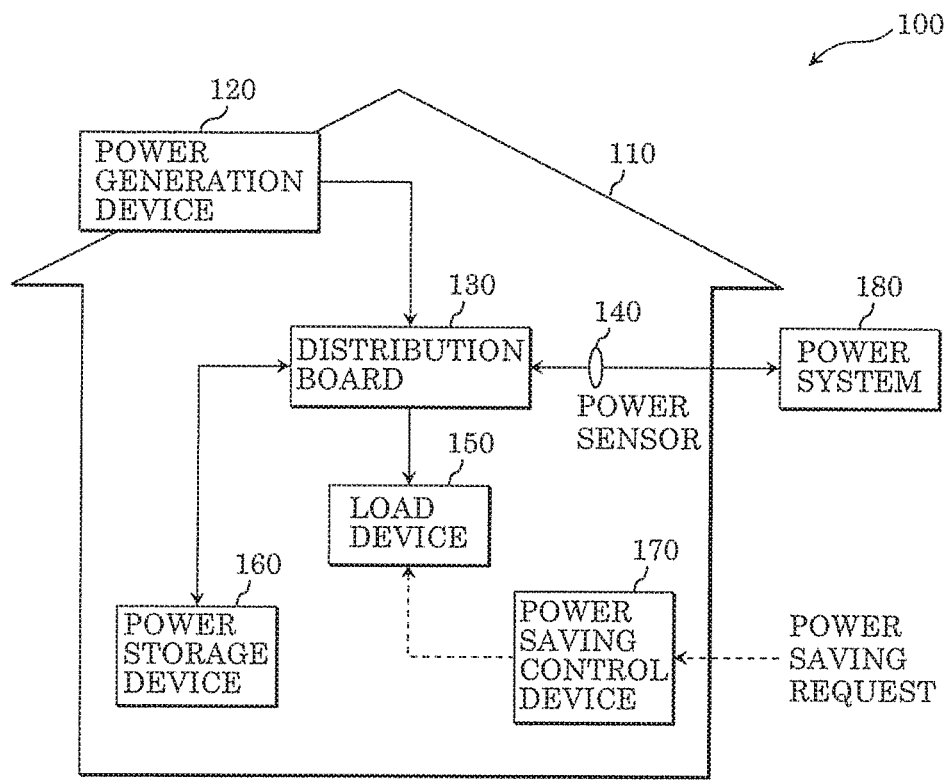
FIG. 3 is a block diagram illustrating the configuration of a power saving control system in an embodiment.

FIG. 3 is a block diagram illustrating the configuration of a power saving control system including a power saving control device in this embodiment. As shown in FIG. 3, power saving control system 100 in this embodiment includes power generation device 120, distribution board 130, power sensor 140, load device 150, power storage device 160, and power saving control device 170. These components are installed in facility 110.

Facility 110 is a facility of a consumer (consuming user). Consumer facility 110 may be the house of a consumer, may be the room of a consumer, or may be the office of a consumer.

Power generation device 120 is a device that generates power. For instance, power generation device 120 may be a natural energy power generation device that generates power using natural energy, an engine power generator that generates power using an internal-combustion engine, or a fuel cell that generates power using a chemical reaction. The natural energy power generation device is, for instance, a solar power generation device that generates power using sunlight. The engine power generator is, for instance, a gas engine power generator that generates power using a gas engine.

Distribution board 130 is an electric circuit including a branch circuit for supplying power to load device 150 and the like. Specifically, distribution board 130 is connected to power generation device 120, load device 150, power storage device 160, and power system 180, For instance, power is inputted to distribution board 130 from power generation device 120, power storage device 160, and power system 180. Power is outputted from distribution board 130 to load device 150, power storage device 160, and power system 180.

Power sensor 140 is a sensor for measuring power. Power sensor 140 is installed at a system interconnection point between distribution board 130 and power system 180, and measures power at the system interconnection point.

For instance, power sensor 140 measures the power that flows from power system 180 into facility 110. In addition, power sensor 140 may measure the power that flows out from facility 110 to power system 180. The power that flows from power system 180 into facility 110 may be represented using positive (plus), and the power that flows out from facility 110 to power system 180 may be represented using negative (minus).

Here, the system interconnection point refers to a position at which equipment (such as power storage device 160) in facility 110 and power system 180 are electrically connected, and specifically, refers to a position on a power line between distribution board 130 and power systems 180. The system interconnection point is basically a position inside facility 110, however, may be a position outside facility 110. For instance, the system interconnection point may be at a position in the secondary side of an electric transformer for power distribution of power system 180.

Also, the power that flows from power system 180 into facility 110 is also called purchased electric power, and is equivalent to the power that is purchased by a consumer from an electric power company. The power that flows out from facility 110 to power system 180 is also called sold electric power, and is equivalent to the power that is sold by a consumer to an electric power company. The current flow of the power that flows from power system 180 into facility 110 is called a forward current flow. The current flow of the power that flows out from facility 110 to power system 180 is called a reverse current flow.

For instance, when power generation device 120 is a natural energy power generation device, the reverse current flow of the power outputted from power generation device 120 may be permitted to promote utilization of natural energy. On the other hand, when power generation device 120 is not a natural-energy power generator, the reverse current flow of the power outputted from power generation device 120 may be prohibited. The adverse current flow of the power outputted from power storage device 160 may also be prohibited.

Load device 150 is a device that consumes power. For instance, load device 150 is a household electrical appliance. Specifically, load device 150 may be an air conditioner, may be a light fixture, or may be a television receiver.

Also, load device 150 may consume power that flows from power system 180 into facility 110, may consume the power outputted from power generation device 120, or may consume the power discharged from power storage device 160. The power that flows out from facility 110 to power system 180 is, for instance, the power that is outputted from power generation device 120, not consumed by load device 150, and not charged by power storage device 160.

Power storage device 160 is a device for performing charge discharge of power. Specifically, power storage device 160 charges a storage battery inside power storage device 160 with power, and power is discharged from the storage battery inside power storage device 160, Power storage device 160 may be provided with a bidirectional inverter for controlling (adjusting) charge and discharge. For instance, the power supplied from power generation device 120 or power system 180 via distribution board 130 is charged to power storage device 160. For instance, the power discharged from power storage device 160 is supplied to load device 150 via distribution board 130.

For instance, power storage device 160 stores surplus power which is obtained by excluding the power consumption of load device 150 from the output power of power generation device 120. For instance, discharge power of power storage device 160 is used for insufficient power which is obtained by excluding the output power of power generation device 120 from the power consumption (demand power) of load device 150. That is to say, power storage device 160 may reduce the power that flows from power system 180 into facility 110, and the power that flows out from facility 110 to power system 180 by performing charge and discharge. Thus, a power transmission loss is reduced.

Power saving control device 170 is a device for performing the power saving control of load device 150 based on a power saving request. Power saving control device 170 may be a computer device that executes a program for the power saving control, or a circuit device for performing the power saving control. In addition, power saving control device 170 may include a processor, a memory, a communication interface, and an input/output interface.

For instance, power saving control device 170 acquires a power saving request from an electric power company or the like. Power saving control device 170 may obtain a power saving request by receiving a power saving request signal that is a signal indicating a power saving request. The power saving request signal may be a signal called a demand response signal.

Power saving control device 170 then determines whether or not the power saving control is to be performed in response to the power saving request. That is, power saving control device 170 determines whether or not the power saving control is to be performed as a response to the power saving request, Specifically, when it is presumed that reduction in the power consumption of load device 150 contributes to the stable operation of power system 180, power saving control device 170 determines that the power saving control is to be performed. On the other hand, when it is presumed that reduction in the power consumption of load device 150 does not contribute to the stable operation of power system 180, power saving control device 170 determines that the power saving control is not to be performed.

For instance, when power flows from power system 180 into facility 110 or power flows out from facility 110 to power system 180, it is presumed that reduction in the power consumption of load device 150 contributes to the stable operation of power system 180, Therefore, in this case, power saving control device 170 determines that the power saving control is to be performed.

In contrast, when no power flows from power system 180 into facility 110 or no power flows out from facility 110 to power system 180, it is presumed that reduction in the power consumption of load device 150 does not contribute to the stable operation of power system 180, Therefore, in this case, power saving control device 170 determines that the power saving control is not to be performed.

When it is not determined that the power saving control is to be performed, power saving control device 170, may determine that the power saving control is not to be performed, or when it is not determined that the power saving control is not to be performed, power saving control device 170 may determine that the power saving control is to be performed.

When it is determined that the power saving control is to be performed, power saving control device 170 performs the power saving control. On the other hand, when it is determined that the power saving control is not to be performed, power saving control device 170 does not perform the power saving control.

It is to be noted that an electric power company or the like measures and predicts, for instance, power supply and demand, and when power supply and demand is in critical condition, makes a power saving request. At this point, a power saving management device (not illustrated) owned by the electric power company or the like may make the power saving request by transmitting a power saving request signal to power saving control device 170. Here, the electric power company or the like may be the electric power company itself, or may be a business operator who serves as a broker between the electric power company and consumers. A business operator who serves as a broker between an electric power company and consumers is also called an aggregator, For instance, power saving control device 170 may perform the power saving control at the timing of acquiring a power saving request, or may perform the power saving control at another timing. For instance, when a requested time period for power saving is specified in a power saving request or a power saving request signal, power saving control device 170 may perform the power saving control in the requested time period for power saving. Specifically, when requested execution of power saving starts two hours after reception of a power saving request signal, power saving control device 170 may perform the power saving control two hours after reception of a power saving request signal.

Also, specifically, the power saving control of load device 150 is the control (processing) for reducing the power consumption of load device 150. Power saving control device 170 may perform the power saving control by stopping load device 150, or may perform the power saving control by changing the operation mode of load device 150. For instance, when load device 150 is an air conditioner, power saving control device 170 reduces the power consumption of load device 150 by stopping the air conditioner or setting the preset temperature of the air conditioner closer to the ambient temperature.

Power saving control device 170 may perform the power saving control by notifying a consumer of a message that prompts the consumer to reduce the power consumption of load device 150. For instance, power saving control device 170 may notify a consumer of a message that prompts the consumer to stop load device 150 or change the operation mode of load device 150. In this case, the power consumption of load device 150 is reduced by a consumer stopping load device 150 or changing the operation mode of load device 150 according to a message.

Power system 180 is a system for supplying power, and includes, for instance, a power plant and a distribution network operated by an electric power company. Power system 180 supplies power to load device 150 and power storage device 160 via distribution board 130.

Figure 4:
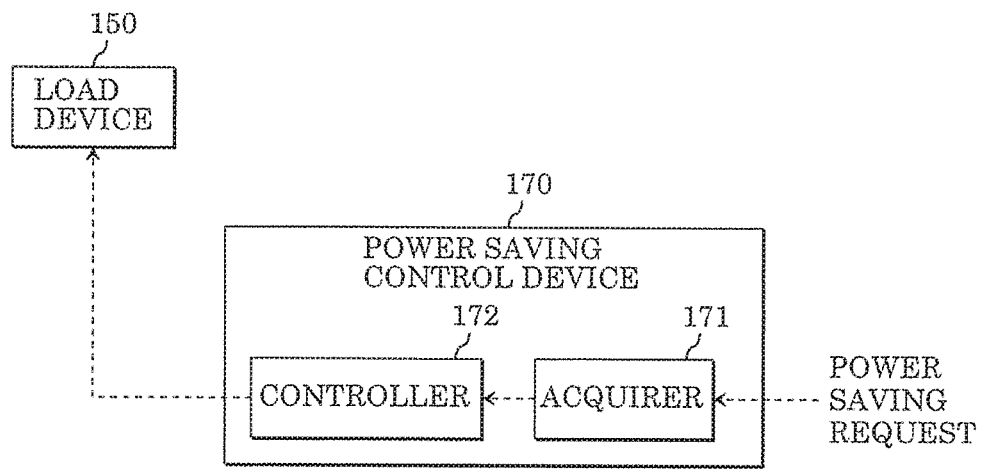
FIG. 4 is a block diagram illustrating the configuration of a power saving control device in the embodiment.

FIG. 4 is a block diagram illustrating the configuration of power saving control device 170 illustrated in FIG. 3. Power saving control device 170 includes, for instance, acquirer 171 and controller 172 as shown in FIG. 4.

Acquirer 171 is a processor that acquires a power saving request. Acquirer 171 may be a communication interface for acquiring information from the outside, or may be an input interface. Also, acquirer 171 may be an electric circuit, such as a processor, that acquires information from a communication interface or an input interface. For instance, acquirer 171 acquires a power saving request by receiving a power saving request signal transmitted from power saving management device of an electric power company or the like.

Also, acquirer 171 may acquire forward current flow information that indicates whether or not power flows from power system 180 into facility 110, and may acquire reverse current flow information that indicates whether or not power flows out from facility 110 to power system 180. The forward current flow information may be a value indicating the power that flows from power system 180 into facility 110, and the reverse current flow information may be a value indicating the power that flows out from facility 110 to power system 180.

For instance, acquirer 171 may acquire the forward current flow information and the reverse current flow information by acquiring the value of the power measured at the system interconnection point from power sensor 140. Also, acquirer 171 may acquire the forward current flow information and the reverse current flow information from power system 180 instead of power sensor 140.

Also, acquirer 171 may acquire current flow information including at least one of the forward current flow information and the reverse current flow information. For instance, the current flow information may be a v indicating the power that flows from power system 180 into facility 110 using positive (plus), and the power that flows out from facility 110 to power system 180 using negative (minus).

Also, acquirer 171 may acquire power consumption information indicating whether or not load device 150 consumes power. The power consumption information may be a value indicating the power consumption of load device 150. Acquirer 171 may acquire the power consumption information from load device 150, or may acquire the power consumption information from the power sensor (not illustrated) between distribution board 130 and load device 150.

Also, acquirer 171 may acquire the remaining amount of stored power of power storage device 160. At this point, acquirer 171 may acquire the remaining amount of stored power of power storage device 160, or may acquire the remaining amount of stored power by estimating the remaining amount of stored power based on a measured value of the voltage of power storage device 160 acquired from a voltage sensor (not illustrated).

Also, acquirer 171 may acquire a charge rate of power storage device 160 that is charging, or may acquire a discharge rate of power storage device 160 that is discharging. At this point, acquirer 171 may acquire a charge rate or a discharge rate from power storage device 160, or may acquire a charge rate or a discharge rate from the power sensor (not illustrated) between distribution board 130 and power storage device 160.

It is to be noted that the charge rate is a value indicating power charged to power storage device 160 per unit of time, and the discharge rate is a value indicating the power discharged from power storage device 160 per unit of time.

For instance, acquirer 171 acquires the above-mentioned power saving request, forward current flow information, reverse current flow information, power consumption information, remaining amount of stored power, charge rate, and discharge rate from the outside of power saving control device 170 via wired or wireless communication. Acquirer 171 may be divided into multiple acquirers, such as a power saving request acquirer, a current flow information acquirer, a power consumption information acquirer, a remaining amount of stored power acquirer, and a charge and discharge rate acquirer.

Controller 172 is a processor that; determines whether or not the power saving control is to be performed in response to a power saving request, and when determining that the power saving control is to be performed, performs the power saving control. The power saving control is control for reducing the power consumption of load device 150. Controller 172 may include a processor, a memory, and an input/output circuit for determining whether or not the power saving control is to be performed and for performing the power saving control. Controller 172 may include a communication interface for transmitting information to the outside, and may perform communication via an input/output circuit.

For instance, controller 172 transmits a control signal for reducing the power consumption of load device 150 to load device 150 via wired or wireless communication. Load device 150 receives a control signal and reduces the power consumption based on the control signal.

Specifically, controller 172 transmits to load device 150 a control signal for stopping load device 150, or a control signal for changing the operation mode of load device 150 to an operation mode with a lower power consumption. Load device 150 receives a control signal, and stops the operation of itself, or changes the operation mode of itself to an operation mode with a lower power consumption based on the control signal. Thus, the power consumption of load device 150 is reduced.

Alternatively, controller 172 may output a message that prompts to stop load device 150 or change the operation mode of load device 150. Controller 172 may output a message to the screen (not illustrated) provided in power saving control device 170, or output a message by voice via a loudspeaker (not illustrated) provided in power saving control device 170.

Alternatively, controller 172 may output a message by transmitting the message via wired or wireless communication to an external communication terminal, such as a mobile phone or a smartphone held by a consumer. In this case, the power consumption of load device 150 is reduced by a consumer stopping load device 150 or changing the operation mode of load device 150 to an operation mode with a lower power consumption based on the message.

Figure 5:
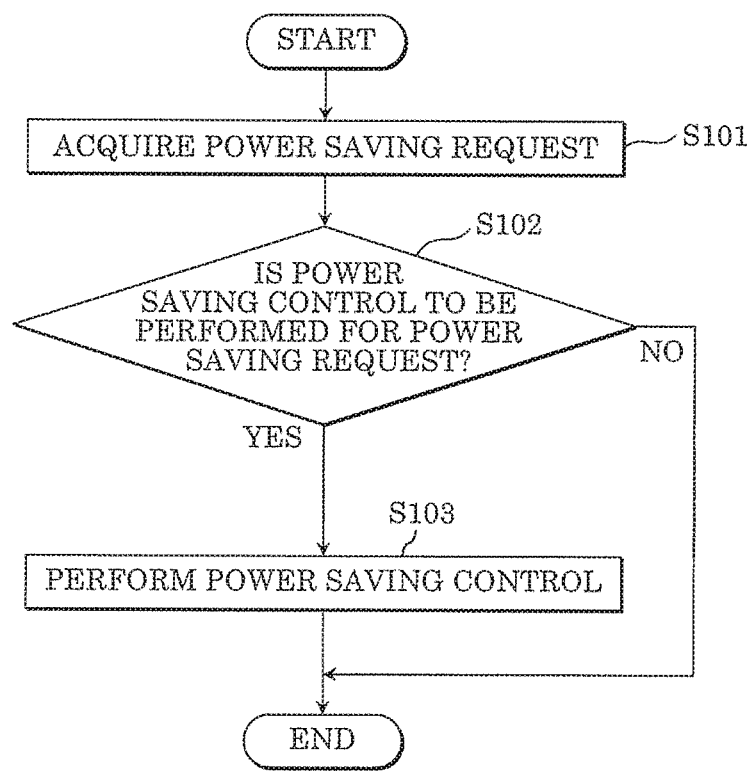
FIG. 5 is a flowchart illustrating the operation of the power saving control device in the embodiment.
Figure 6:
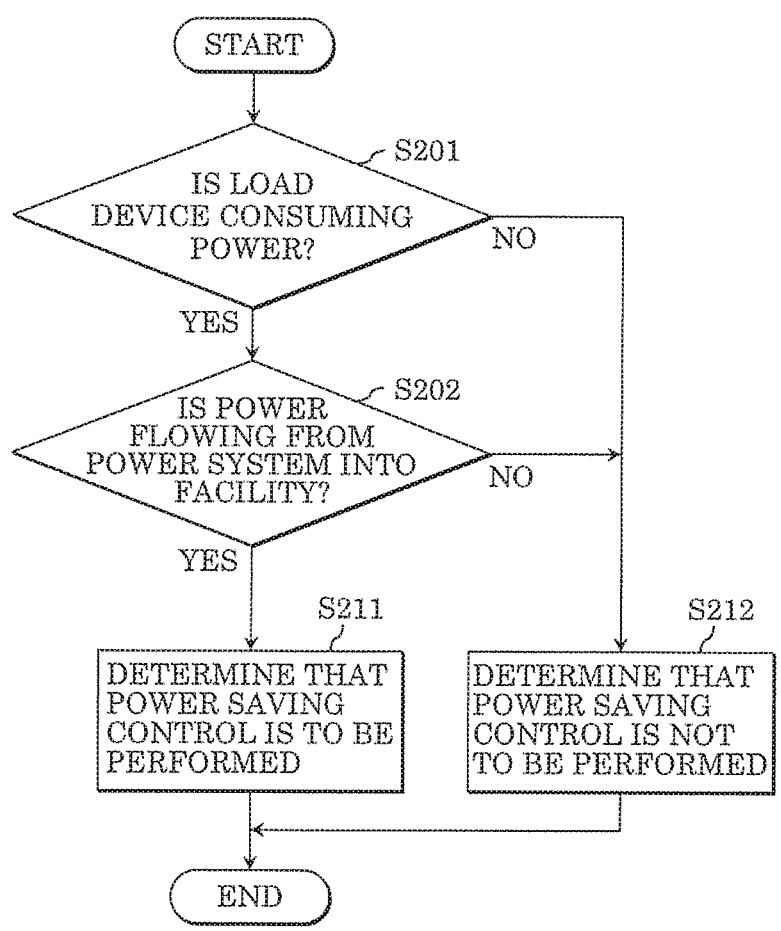
FIG. 6 is a flowchart illustrating a first determination example in the embodiment.

FIG. 5 is a flowchart illustrating the operation of power saving control device 170 illustrated in FIG. 4. Power saving control device 170 determines whether or not the power saving control is to be performed in accordance with the operation illustrated in FIG. 5, and when determining that the power saving control is to be performed, performs the power saving control. Hereinafter, a description will be specifically given.

First, acquirer 171 of power saving control device 170 acquires a power saving request (S101). For instance, acquirer 171 acquires a power saving request by receiving a power saving request signal transmitted from a power saving management device of an electric power company or the like.

Next, controller 172 of power saving control device 170 determines whether or not the power saving control is to be performed in response to a power saving request (S102). That is, controller 172 determines whether or not the power saving control is to be performed as a response to the power saving request.

Specifically, controller 172 determines whether or not a condition for performing the power saving control or a condition for not performing the power saving control is satisfied. Controller 172 may acquire information for determining whether or not a condition is satisfied from power sensor 140, load device 150, and power storage device 160 and the like via acquirer 171. Controller 172 then determines whether or not a condition is satisfied based on the acquired information, and determines whether or not the power saving control is to be performed in response to the power saving request according to whether or not the condition is satisfied.

When it is determined that the power saving control is to be performed (Yes in S102), controller 172 performs the power saving control (S103). On the other hand, when it is determined that the power saving control is not to be performed (No in S102), controller 172 does not perform the power saving control.

It is to be noted that acquisition of a power saving request (S101), determination of whether or not the power saving control is to be performed (S102), and the power saving control (S103) may be performed continuously or may be performed discontinuously. That is, a time interval may be provided between these processing.

Hereinafter, multiple examples will be illustrated using FIG. 6 to FIG. 11 for determining whether or not power saving control device 170 illustrated in FIG. 4 performs the power saving control.

FIG. bis a flowchart illustrating a first determination example of whether or not power saving control device 170 illustrated in FIG. 4 performs the power saving control.

In this determination example, controller 1'72 of power saving control device 170 first determines whether or not load device 150 consumes power (S201). For instance, acquirer 171 acquires the power consumption information on load device 150. Controller 172 then determines whether or not load device 150 consumes power based on the acquired power consumption information.

When load device 150 consumes no power (No in S201), controller 172 determines that the power saving control is not to be performed (S212). When load device 150 consumes power (Yes in S201), controller 172 determines whether or not power flows from power system 180 into facility 110 (S202).

For instance, acquirer 171 acquires current information on the system interconnection point. Controller 172 determines whether or not power flows from power system 180 into facility 110, based on the acquired current flow information.

When power flows from power system 180 into facility 110 (Yes in S202), controller 172 determines that the power saving control is to be performed (S211). When no power flows from power system. 180 into facility 110 (No in S202), controller 172 determines that the power saving control is not to be performed (S212).

When load device 150 consumes power, controller 172 determines based on the above-described operation that the power saving control is not to be performed under the condition that no power flows from power system 180 into facility 110.

For instance, in the case where load device 150 consumes power, when power flows from power system 180 into facility 110, it is presumed that insufficient power exists, the insufficient power corresponding to the power obtained by excluding the output power of power generation device 120 from the power consumption of load device 150. It is presumed that the supply power of power system 180 is used, but the discharge power of power storage device 160 is not used for the insufficient power.

Specifically, power storage device 160 does not discharge for the insufficient power in some cases. Also, power storage device 160 is unable to discharge due to shortage of the remaining amount in some cases. Also, power storage device 160 is unable to discharge for all the insufficient power due to the upper limit of the discharge rate in some cases. In such a case, it is presumed that the power of power system 180 flows from power system 180 into facility 110.

In the case where load device 150 consumes power and power flows from power system 180 into facility 110, when the power consumption of load device 150 is reduced, it is presumed that the insufficient power is decreased, and the power which flows from power system 180 is decreased. Therefore, in such a case, the load of power system 180 is reduced, and critical condition of power supply and demand is eliminated by performing the power saving control On the other hand, for instance, even in the case where load device 150 consumes power, when no power flows from power system 180 into facility 110, it is presumed that the supply power of power system 180 is not used for the insufficient power. Specifically, in such a case, it is presumed that the discharge power of power storage device 160 is used for the insufficient power. In such a case, it is presumed that even when the power consumption of load device 150 is reduced, the discharge power of power storage device 160 is only reduced, and the state of power system 180 does not change.

Therefore, when load device 150 consumes power and no power flows from power system 180 into facility 110, it is presumed that it is inappropriate to perform the power saving control because reduction in the power consumption does not contribute to the stable operation of power system 180. Thus, in such a case, controller 172 determines that the power saving control is not to be performed. Thus, power saving control device 170 avoids inappropriate execution of the power saving control.

When load device 150 does not consume power, the power consumption of load device 150 is not reduced, thus controller 172 determines that the power saving control is not to be performed without depending on the flow current information.

Figure 7:
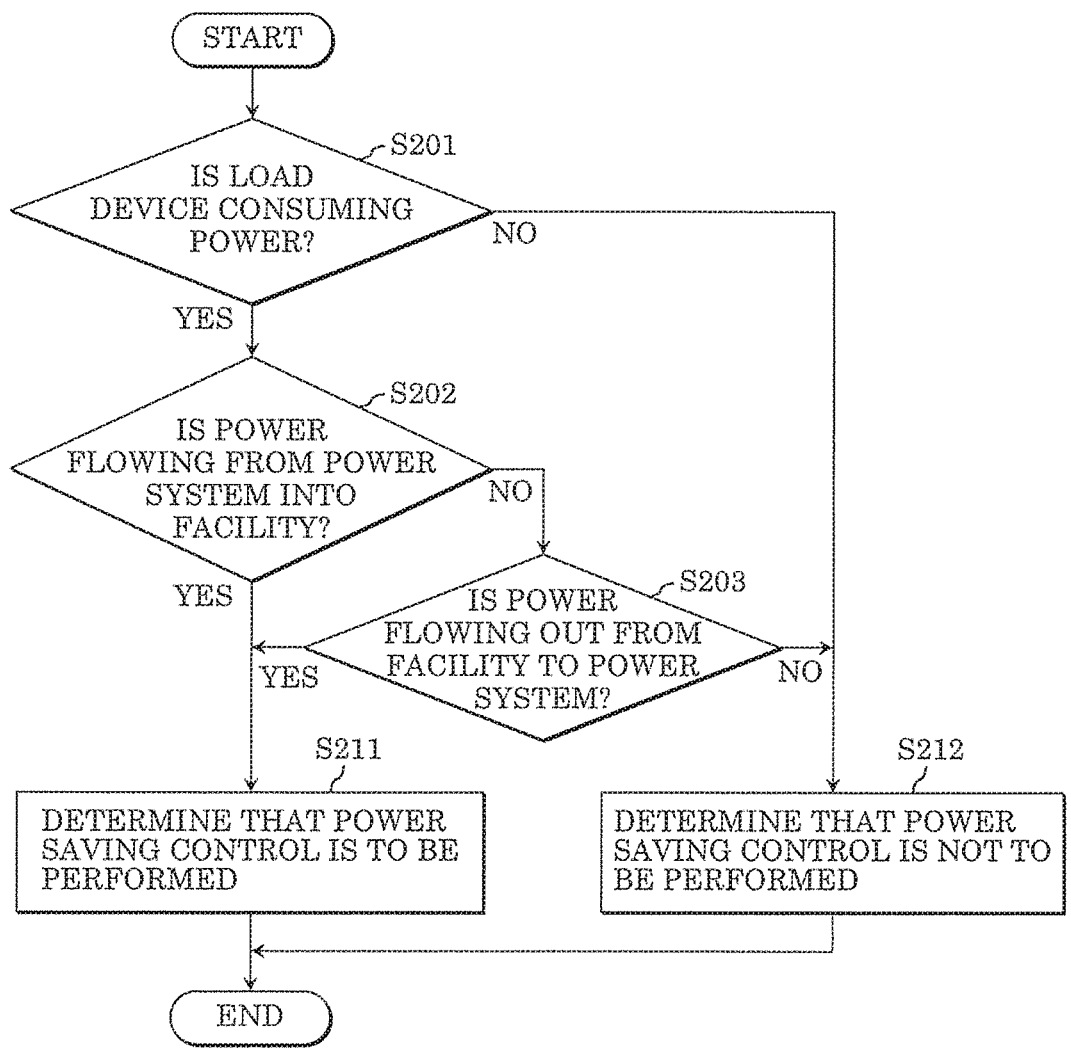
FIG. 7 is a flowchart illustrating a second determination example in the embodiment.

FIG. 7 is a flowchart illustrating a second determination example of whether or not power saving control device 170 illustrated in FIG. 4 performs the power saving control. The determination of whether or not load device 150 consumes power (S201), the determination of whether or not power flows from power system 180 into facility 110 (S202), the determination that the power saving control is to be performed (S211), and the determination that the power saving control is not to be performed (S211) are the same as those in the first determination example.

In this determination example, when no power flows from power system 180 into facility 110 (No in S202), controller 172 of power saving control device 170 determines whether or not power flows out from facility 110 to power system 180 (S203). For instance, acquirer 171 acquires the current information on the system interconnection point. Controller 172 then determines whether or not power flows out from facility 110 to power system 180 based on the acquired current information.

When power flows out from facility 110 to power system 180 (Yes in S203), controller 172 determines that the power saving control is to be performed (S211). When no power flows out from facility 110 to power system 180 (No in S203), controller 172 determines that the power saving control is not to be performed (S212).

Controller 172 determines based on the above-described operation that power saving control is not to be performed under the condition that no power flows from power system 180 into facility 110, and no power flows out from facility 110 to power system 180. The reason why no power flows from power system 180 into facility 110 is used as a condition is as described in the first determination example. The reason why no power flows out from facility 110 to power system 180 is used as a condition will be described in the following.

For instance, when load device 150 consumes power, and power flows out from facility 110 to power system 180, it is presumed that the surplus power obtained by excluding the power consumption of load device 150 from the output power of power generation device 120 flows out without being charged to power storage device 160.

Specifically, power storage device 160 is not charged with the surplus power in some cases. Also, power storage device 160 is fully charged and cannot be charged in some cases. Also, power storage device 160 cannot be charged with all the surplus power due to the upper limit of the charge rate in some cases. In such a case, it is presumed that the surplus power flows out from facility 110 to power system 180.

In the case where load device 150 consumes power, and power flows out from facility 110 to power system 180, when the power consumption of load device 150 is reduced, it is presumed that the surplus power is increased, and the power which flows out to power system 180 is increased. Therefore, in such a case, the load of power system 180 is reduced, and critical condition of power supply and demand is eliminated by performing the power saving control.

On the other hand, when load device 150 consumes power, and no power flows out from facility 110 to power system 180, it is presumed that power storage device 160 is charged with the surplus power which is obtained by excluding the power consumption of load device 150 from the output power of power generation device 120. In such a case, it is presumed that even when the power consumption of load device 150 is reduced to increase the surplus power, the power charged to power storage device 160 is only increased, and the state of power system 180 does not change.

Therefore, when load device 150 consumes power, and no power flows out from facility 110 to power system 180, it is presumed that it is inappropriate to perform the power saving control because reduction in the power consumption does not contribute to the stable operation of power system 180. Thus, in such a case, controller 172 determines that the power saving control is not to be performed. Thus, power saving control device 170 avoids inappropriate execution of the power saving control.

Figure 8:
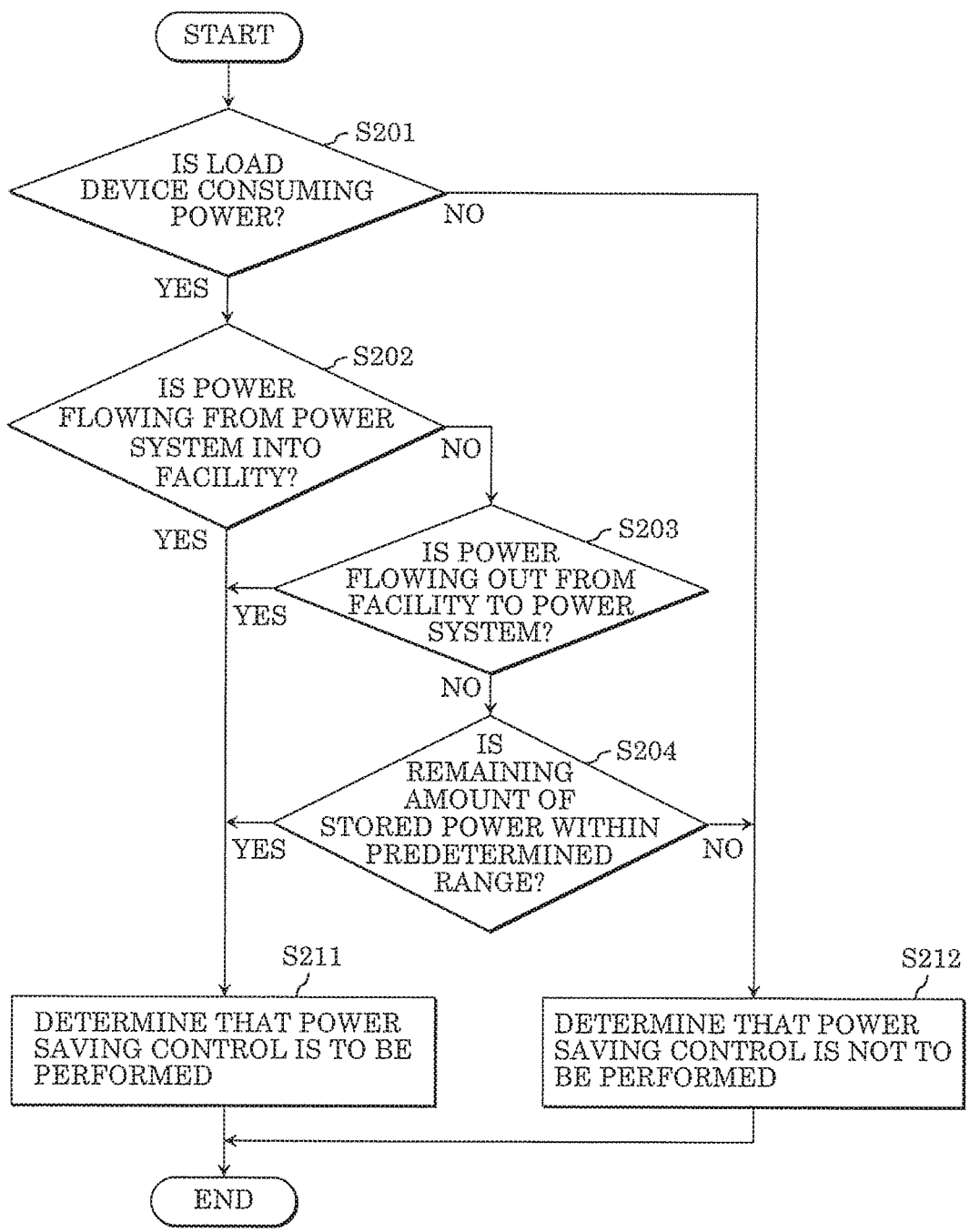
FIG. 8 is a flowchart illustrating a third determination example in the embodiment.

FIG. 8 is a flowchart illustrating a third determination example of whether or not power saving control device 170 illustrated in FIG. 4 performs the power saving control. In contrast to the second determination example, in this determination example, determination (S204) of whether or not the remaining amount of stored power of power storage device 160 is within a predetermined range (predetermined stored power remaining amount range) is further added. Other operations are the same as the operations in the second determination example.

Specifically, when no power flows out from facility 110 to power system 180 (No in S203), controller 172 of power saving control device 170 determines whether or not the remaining amount of stored power of power storage device 160 is within a predetermined stored power remaining amount range (S204). For instance, acquirer 171 acquires the remaining amount of stored power of power storage device 160. Controller 172 then determines whether or not the acquired remaining amount of stored power is within a predetermined stored power remaining amount range. Here, the predetermined stored power remaining amount range is a range which is determined in advance and for which it is difficult for power storage device 160 to continue charge and discharge.

For instance, the predetermined stored power remaining amount range is a range from 0% of the capacity of power storage device 160 to a nearby value when power storage device 160 is discharged, and is a range from 100% of the capacity of power storage device 160 to a nearby value when power storage device 160 is charged. The range from 0% of the capacity of power storage device 160 to a nearby value may be the range from 0% to 10% of the capacity of power storage device 160, and the range from 100% of the capacity of power storage device 160 to a nearby value may be the range from 90% to 100% of the capacity of power storage device 160.

When the remaining amount of stored power of power storage device 160 is within the predetermined stored power remaining amount range (Yes in S204), controller 172 determines that the power saving control is to be performed (S211). When the remaining amount of stored power of power storage device 160 is not within the predetermined stored power remaining amount range (No in S204), controller 172 determines that the power saving control is not to be performed (S212).

Controller 172 determines based on the above-described operation that the power saving control is not to be performed under the condition that the remaining amount of stored power of power storage device 160 is not within the predetermined stored power remaining amount range.

As described above, when load device 150 consumes power, no power flows from power system 180 into facility 110, and no power flows out from facility 110 to power system 180, it is presumed that even when the power saving control is performed, the state of power system 180 does not change. Therefore, in such a case, it is presumed that it is inappropriate to perform the power saving control.

However, when power storage device 160 is discharged and the remaining amount of stored power of power storage device 160 is close to 0%, it is difficult for power storage device 160 to continue to be discharged for a long period of time. In addition, when power storage device 160 is charged and the remaining amount of stored power of power storage device 160 is close to 100%, it is difficult for power storage device 160 to continue to be charged for a long period of time. Therefore, in the near future, it is highly likely that charge and discharge is stopped, and thus that reduction in the power consumption of load device 150 is highly likely to contribute to the stable operation of power system 180.

Thus, even when no power flows from power system 180 into facility 110, and no power flows out from facility 110 to power system 180, when the remaining amount of stored power of power storage device 160 is within the predetermined stored power remaining amount range, controller 172 determines that the power saving control is to be performed.

On the other hand, when the remaining amount of stored power of power storage device 160 is not within the predetermined stored power remaining amount range, it is unlikely that charge and discharge is stopped, and thus reduction in the power consumption of load device 150 is unlikely to contribute to the stable operation of power system 180.

Therefore, controller 172 determines that the power saving control is not to be performed under the condition that the remaining amount of stored power of power storage device 160 is not within the predetermined stored power remaining amount range. Thus, power saving control device 170 can appropriately determine whether or not the power saving control is to be performed.

Figure 9:
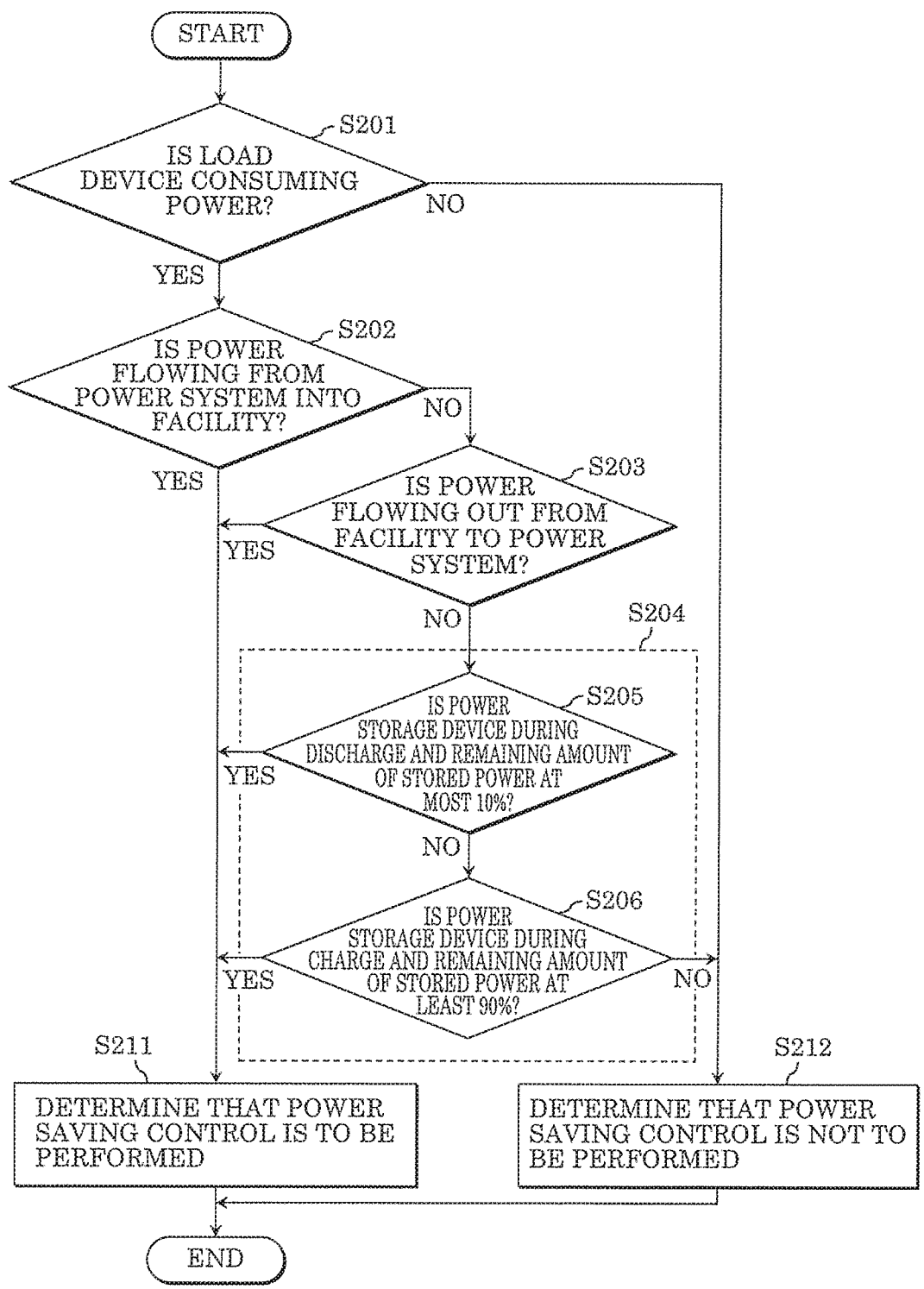
FIG. 9 is a flowchart illustrating the details of the third determination example in the embodiment.

FIG. 9 is a flowchart illustrating the details of the third determination example illustrated in FIG. 8. In FIG. 9, a specific example related to the third determination example illustrated in FIG. 8 is illustrated, and the determination (S204) of whether or not the remaining amount of stored power is within a predetermined range is illustrated in detail. In this specific example, determination of whether or not power storage device 160 is discharging and the remaining amount of stored power is at most 10% (S205), and determination of whether or not power storage device 160 is charging and the remaining amount of stored power is at least 90% (S206) are performed as the determination of whether or not the remaining amount of stored power is within a predetermined range (S204).

That is, when no power flows out from facility 110 to power system 180 (No in S203), controller 172 determines whether or not power storage device 160 is discharging and the remaining amount of stored power of power storage device 160 is at most 10% of the capacity of power storage device 160 (S205). When power storage device 160 is discharging and the remaining amount of stored power of power storage device 160 is at most (Yes in S205), controller 172 determines that, the power saving control is to be performed (S211).

On the other hand, when power storage device 160 is not discharging or the remaining amount of stored power is not at most 10% (No in S205), controller 172 determines whether or not power storage device 160 is charging and the remaining amount of stored power of power storage device 160 is at least 90% of the capacity of power storage device 160 (S206). When power storage device 160 is charging and the remaining amount of stored power of power storage device 160 is at least 90% (Yes in S206), controller 172 determines that the power saving control is to be performed (S211).

On the other hand, when power storage device 160 is not charging or the remaining amount of stored power is not at least 90% (No in S206), controller 172 determines that the power saving control is not to be performed (S212).

That is, in this specific example, it is determined whether or not the remaining amount of stored power of power storage device 160 is within the predetermined stored power remaining amount range (S204). The predetermined stored power remaining amount range is the range from 0% to 10% of the capacity of power storage device 160 when power storage device 160 is discharging, or is the range from 90% to 100% of the capacity of power storage device 160 when power storage device 160 is charging.

When the remaining amount of stored power of power storage device 160 is within the predetermined stored power remaining amount range, controller 172 determines that the power saving control is to be performed. On the other hand, when the remaining amount of stored power of power storage device 160 is not within the predetermined stored power remaining amount range, controller 172 determines that the power saving control is not to be performed. That is, controller 172 determines that the power saving control is not to be performed under the condition that the remaining amount of stored power of power storage device 160 is not within the predetermined stored power remaining amount range.

Controller 172 can appropriately determine whether or not the power saving control is to be performed, based on the above-described operation.

Figure 10:
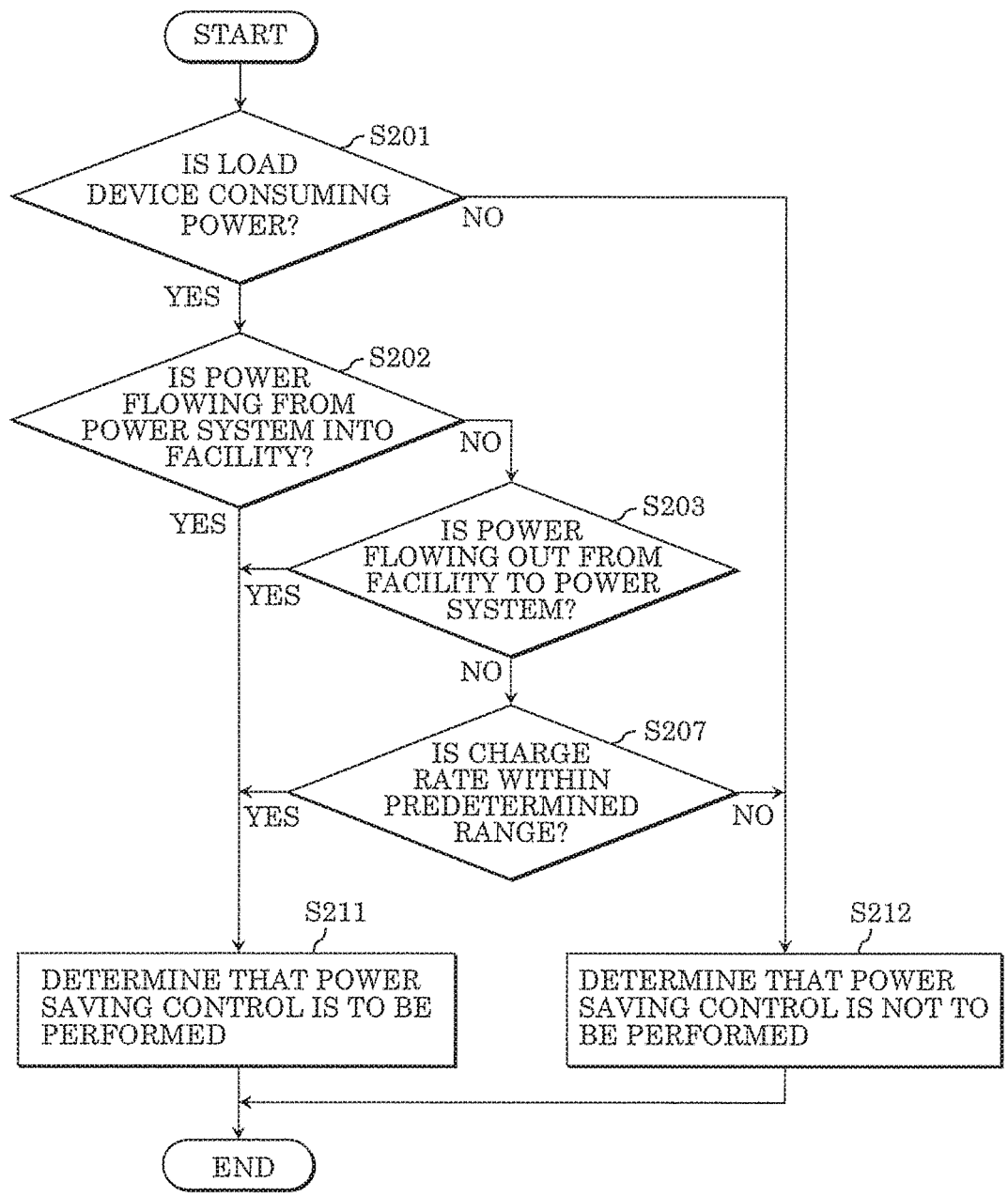
FIG. 10 is a flowchart illustrating a fourth determination example in the embodiment.

FIG. 10 is a flowchart illustrating a fourth determination example of whether or not power saving control device 170 illustrated in FIG. 4 performs the power saving control. In contrast to the second determination example, in this determination example, determination (S207) of whether or not the charge rate of power storage device 160 is within a predetermined range (predetermined charge rate range) is further added. Other operations are the same as the operations in the second determination example.

Specifically, when no power flows out from facility 110 to power system 180 (No in S203), controller 172 of power saving control device 170 determines whether or not the charge rate of power storage device 160 is within a predetermined charge rate range (S207). For instance, acquirer 171 acquires the charge rate of power storage device 160, Controller 172 then determines whether or not the acquired charge rate is within the predetermined charge rate range.

Here, the predetermined charge rate range is a range which is determined in advance and for which the charge rate of power storage device 160 is highly likely to reach the upper limit of the charge rate due to an increase in the surplus power in associated with reduction in the power consumption. For instance, the predetermined charge rate range is a range from 100% of the upper limit to a nearby value. The range from 100% of the upper limit to a nearby value may be the range from 90% to 100% of the upper limit.

When the charge rate of power storage device 160 is within the predetermined charge rate range (Yes in S207), controller 172 determines that the power saving control is to be performed (S211). When the charge rate of power storage device 160 is not within the predetermined charge rate range (No in S207), controller 172 determines that the power saving control is not to be performed (S212).

Controller 172 determines based on the above-described operation that the power saving control is not to be performed under the condition that the charge rate of power storage device 160 is not within the predetermined charge rate range.

For instance, when load device 150 consumes power, no power flows from power system 180 into facility 110, and no power flows out from facility 110 to power system 180, it is presumed that even when the power saving control is performed, the state of power system 180 does not change. Therefore, in such a case, it is presumed that it is inappropriate to perform the power saving control.

However, when the charge rate of power storage device 160 is close to 100%, the charge rate may reach 100% due to an increase in the surplus power. When the surplus power is further increased, the surplus power, part of which has not been used for charging, due to the upper limit of the charge rate, flows into power system 180. Therefore, when the charge rate of power storage device 160 is close to 100%, due to reduction in the power consumption of load device 150, the surplus power is increased, which is highly likely to contribute to the stable operation of power system 180.

Thus, even when no power flows from power system 180 into facility 110, and no power flows out from facility 110 to power system 180, when the charge rate of power storage device 160 is within the predetermined charge rate range, controller 172 determines that the power saving control is to be performed.

On the other hand, when the charge rate of power storage device 160 is not within, the predetermined charge rate range, power is unlikely to flow out from facility 110 to power system 180 due to an increase in the surplus power in associated with reduction in the power consumption of load, device 150. Therefore, reduction in the power consumption of load device 150 is unlikely to contribute to the stable operation of power system 180.

Thus, controller 172 determines that the power saving control is not to be performed under the condition that the charge rate of power storage device 160 is not within the predetermined charge rate range. Thus, power saving control device 170 can appropriately determine whether or not the power saving control is to be performed.

Figure 11:
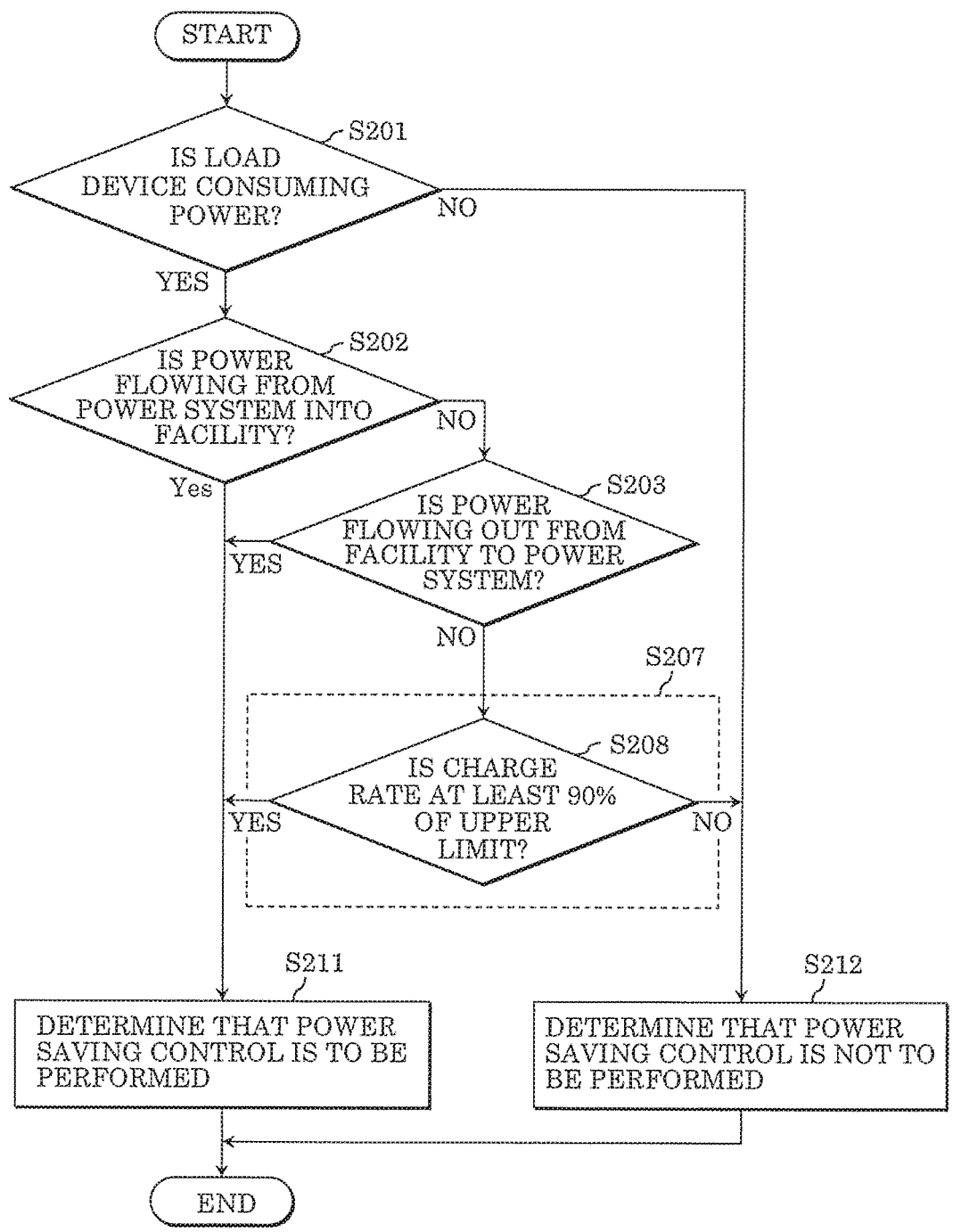
FIG. 11 is a flowchart illustrating the details of the fourth determination example in the embodiment.

FIG. 11 is a flowchart illustrating the details of the fourth determination example illustrated in FIG. 10. In FIG. 11, a specific example related to the fourth determination example illustrated in FIG. 10 is illustrated, and the determination (S207) of whether or not the charge rate is within a predetermined range is illustrated in detail. In this specific example, determination of whether or not the charge rate is at least 90% of the upper limit (S208) is performed as the determination of whether or not the charge rate is within a predetermined range (S207).

That is, when no power flows out from facility 110 to power system 180 (No in S203), controller 172 determines whether or not the charge rate of power storage device 160 is at least 90% of the upper limit (S208). When the charge rate of power storage device 160 is at least 90% of the upper limit (Yes in S208), controller 172 determines that the power saving control is to be performed (S211). On the other hand, when the charge rate of power storage device 160 is at least 90% of the upper limit (No in S208), controller 172 determines that the power saving control is not to be performed (S212).

That is, in this specific example, it is determined whether or not the charge rate of power storage device 160 is within the predetermined charge rate range (S207). The predetermined charge rate range is the range from 0% to 10% of the upper limit of the charge rate.

When the charge rate of power storage device 160 is within the predetermined charge rate range, controller 172 determines that the power saving control is to be performed. On the other hand, when the charge rate of power storage device 160 is not within the predetermined charge rate range, controller 172 determines that the power saving control is not to be performed. That is, controller 172 determines that the power saving control is not to be performed under the condition that the charge rate of power storage device 160 is not within the predetermined charge rate range.

Controller 172 can appropriately determine whether or not the power saving control is to be performed, based on the above-described operation.

In the case where the charge rate of power storage device 160 is in a vicinity (for instance, at most 10% of the upper limit of the charge rate) of the lower limit of the charge rate, when the power consumption of load device 150 is reduced, it is presumed that the charge rate of power storage device 160 is changed away from the lower limit. Thus, when the charge rate of power storage device 160 is in a vicinity of the lower limit, it is presumed that reduction in the power consumption of load device 150 does not contribute to the stable operation of power system 180.

Also, in the case where the discharge rate of power storage device 160 is in a vicinity (for instance, at least 90% of the upper limit of the discharge rate) of the upper limit of the discharge rate, when the power consumption of load device 150 is reduced, it is presumed that the discharge rate of power storage device 160 is changed away from the upper limit. Thus, when the discharge rate of power storage device 160 is in a vicinity of the upper limit, it is presumed that reduction in the power consumption of load device 150 does not contribute to the stable operation of power system 180.

In the case where the discharge rate of power storage device 160 is in a vicinity (for instance, at most 10% of the upper limit of the discharge rate) of the lower limit of the discharge rate, when the power consumption of load device 150 is reduced, it is presumed that the discharge rate of power storage device 160 may reach the lower limit, and the surplus power may occur. However, the surplus power is basically charged to power storage device 160. Thus, when the discharge rate of power storage device 160 is in a vicinity of the lower limit, it is presumed that reduction in the power consumption of load device 150 does not contribute to the stable operation of power system 180.

Therefore, it is determined that the power saving control is to be performed only in the case where the charge rate is in a vicinity of the upper limit among the cases where the charge rate is in a vicinity of the upper limit, the case where the charge rate is in a vicinity of the lower limit, the case where the discharge rate is in a vicinity of the upper limit, and the case where the discharge rate is in a vicinity of the lower limit. Only the condition that the charge rate is not in a vicinity of the upper limit is used as a condition under which the power saving control is not to be performed, among the conditions that the charge rate is not in a vicinity of the upper limit, the charge rate is not in a vicinity of the lower limit, the discharge rate is not in a vicinity of the upper limit, and the discharge rate is not in a vicinity of the lower limit.

In what has been described above, for instance, the upper limit of the charge rate is a maximum charge rate defined in advance for power storage device 160. The upper limit of the discharge rate is a maximum discharge rate defined in advance for power storage device 160. The lower limit of the charge rate is a minimum charge rate defined in advance for power storage device 160, and is specifically 0. The lower limit of the discharge rate is a minimum discharge rate defined in advance for power storage device 160, and is specifically 0.

As described above in the multiple determination examples, even when load device 150 consumes power, controller 172 of power saving control device 170 determines that the power saving control is not to be performed under the condition that no power flows in from power system 180, the condition being one of one or more conditions. That is, even when load device 150 consumes power, controller 172 of power saving control device 170 determines that the power saving control is not to be performed when one or more conditions (one or multiple conditions) including a condition that no power flows in from power system 180 are satisfied.

The one or more conditions may include a condition that no power flows in from power system 180. Also, the one or more conditions may include a condition that the remaining amount of stored power is not within a predetermined stored power remaining amount range. Also, the one or more conditions may include a condition that the charge rate is not within a predetermined charge rate range. The one or more conditions may be all the above-mentioned conditions, or may be one or more conditions arbitrarily selected from all the above-mentioned conditions.

For instance, when load device 150 consumes power and all of the one or more conditions are satisfied, controller 172 of power saving control device 170 determines that the power saving control is not to be performed. On the other hand, when load device 150 consumes power and at least one of the one or more conditions is not satisfied, controller 172 of power saving control device 170 determines that the power saving control is to be performed.

Thus, power saving control device 170 can appropriately determine whether or not the power saving control is to be performed, and can avoid inappropriate power saving control. Thus, power saving control device 170 can avoid obstruction of the utilization of load device 150 due to inappropriate power saving control. Also, power saving control device 170 can contribute to the stable operation of power system 180 by appropriate power saving control.

For instance, a consumer may obtain incentives from an electric power company or the like by decreasing the power that flows from power system 180 into facility 110 or increasing the power that flows out from facility 110 to power system 180 in response to a power saving request. In such a case, power saving control device 170 can reduce occurrence of an adverse effect that a consumer cannot receive incentives due to no change in the inflow power and outflow power in spite of reducing the power consumption of load device 150 by a consumer in response to a power saving request.

Although power saving control device 170 according to the present invention has been described above based on the embodiment, the present invention is not limited to the above described embodiment. Embodiments obtained by making various modifications, which occur to those skilled in the art, to the embodiment, and other embodiments which are achieved by arbitrarily combining the multiple components of the embodiment are also included in the present invention.

For instance, processing performed by a specific component may be performed by another component. Also, the order of processing may be changed, and multiple pieces of processing may be performed in parallel.

Also, communication between components may be a wired communication or a wireless communication. Multiple components which communicate with each other may be connected by a wired transmission path or connected by a wireless transmission path. A communication protocol between the components is not limited to a specific protocol.

Also, power saving control device 170 may be used in an environment including multiple power generation devices 120, may be used in an environment including multiple power storage devices 160, or may be used in an environment including multiple load devices 150. In addition, power saving control device 170 may be used in an environment not including power generation devices 120, or may be used in an environment not including power storage devices 160.

The multiple determination examples illustrated in FIG. 6 to FIG. 11 may be combined. For instance, any multiple determination steps extracted from multiple determination steps (S201 to S208) in FIG. 6 to FIG. 11 may be combined. Specifically, a determination step (S204 of FIG. 8) related to the remaining amount of stored power, and a determination step (S207 of FIG. 10) related to the charge rate may be combined. For instance, in the determination example of FIG. 8 or FIG. 10, a determination step (S203) related to outflow may be omitted.

Also, the present invention can be implemented not only as power saving control device 170, but also as a method including steps (processing) to be performed by components included in power saving control device 170.

For instance, those steps may be performed by a computer (computer systems). The present invention can be implemented as a program that causes a computer to execute the steps included in the method. In addition, the present invention can be implemented as a non-transitory computer-readable recording medium, such as a CD-ROM, on which the program is recorded.

For instance, when the present invention is implemented by a program (software), each of the steps is performed by executing the program utilizing hardware resources, such as a CPU, a memory, and an input/output circuit of a computer. That is, each step is performed by the CPU acquiring data from the memory or the input/output circuit and calculating the data, and outputting a result of the calculation to the memory or the input/output circuit.

Also, multiple components (such as acquirer 171 and controller 172) included in power saving control device 170 may be each implemented as an exclusive-use or general-purpose circuit. These components may be implemented as a single circuit or implemented as multiple circuits.

Also, the multiple components included in power saving control device 170 may be implemented as LSI (Large Scale Integration) which is an integrated circuit (IC). These components may be each individually implemented as a single chip, or a single chip may be implemented to include part or all of the functional blocks. An LSI may be called a system LSI, a super LSI, or an ultra LSI depending on the degree of integration.

Also, an integrated circuit is not limited to an LSI and may be implemented as an exclusive-use circuit or a general-purpose processor. FPGA (Field Programmable Gate Array) which is programmable, or a reconfigurable processor in which connection and setup of the circuit cells inside an LSI can be reconfigured may be utilized.

Furthermore, in the case where a technology of circuit integration which replaces the LSI is invented due to the progress of semiconductor technology or other emerging technologies, multiple components included in power saving control device 170 may be naturally integrated using the technology.

Finally, multiple aspects of power saving control device 170 are illustrated as examples. These aspects may be combined as appropriate. In addition, any components illustrated in the embodiment may be added.

(First Aspect)

Power saving control device 170 according to an aspect of the present invention includes acquirer 171 and controller 172. Acquirer 171 acquires a power saving request. Controller 172 determines whether or not power saving control for reducing the power consumption of load device 150 is to be performed in response to a power saving request, and when determining that the power saving control is to be performed, performs the power saving control. When load device 150 consumes power, controller 172 determines that the power saving control is not to be performed under a condition that no power flows from power system 180 to facility 110 in which load device 150 is installed, the condition being one of one or more conditions.

Thus, when power flows from power system 180, power saving control device 170 can determine that the power saving control is to be performed, and when no power flows in from power system 180, power saving control device 170 can determine that the power saving control is not to be performed. Thus, power saving control device 170 can avoid inappropriate execution of the power saving control. In addition, power saving control device 170 can reduce unnecessary obstruction to utilization of load device 150.

(Second Aspect)

For instance, when load device 150 consumes power, controller 172 may determine that the saving control is not to be performed under a condition that no power flows from facility 110 to power system 180, the condition being one of one or more conditions.

Thus, when power flows out to power system 180, power saving control device 170 can determine that the power saving control is not to be performed, and when no power flows out to power system 180, power saving control device 170 can determine that the power saving control is not to be performed. Thus, power saving control device 170 can avoid inappropriate execution of the power saving control.

(Third Aspect)

For instance, when load device 150 consumes power, controller 172 may determine that the power saving control is not to be performed under a condition that the remaining amount of stored power of power storage device 160 for supplying power to load device 150 is not within a predetermined stored power remaining amount range, the condition being one of the one or more conditions.

Thus, when the remaining amount of stored power is within a predetermined stored power remaining amount range, power saving control device 170 can determine that the power saving control is to be performed, and when the remaining amount of stored power is not within a predetermined stored power remaining amount range, power saving control device 170 can determine that the power saving control is not to be performed. Thus, power saving control device 170 can avoid inappropriate execution of the power saving control.

(Fourth Aspect)

For instance, when power storage device 160 is in discharging, a predetermined stored power remaining amount range may be a range from 0% to 10% of the capacity of power storage device 160, and when power storage device 160 is charging, the predetermined stored power remaining amount range may be a range from 90% to 100% of the capacity of power storage device 160.

Thus, when it is presumed that charge and discharge is stopped, power saving control device 170 can determine that the power saving control is to be performed, and when it is presumed that charge and discharge is continued, power saving control device 170 can determine that the power saving control is not to be performed. Thus, power saving control device 170 can avoid inappropriate execution of the power saving control.

(Fifth Aspect)

For instance, when load device 150 consumes power, controller 172 may determine that the power saving control is not to be performed under a condition that the charge rate of power storage device 160 for supplying power to load device 150 is not within a predetermined charge rate range, the condition being one of the one or more conditions.

Thus, when the charge rate is within a predetermined charge rate range, power saving control device 170 can determine that the power saving control is to be performed, and when the charge rate is not within the predetermined charge rate range, power saving control device 170 can determine that the power saving control is not to be performed. Thus, power saving control device 170 can avoid inappropriate execution of the power saving control.

(Sixth Aspect)

For instance, the predetermined charge rate range may be a range from 90% to 100% of the upper limit of the charge rate.

Thus, when it is presumed that the power saving control contributes to the stable operation of power system 180, power saving control device 170 can determine that the power saving control is to be performed, and when it is presumed that the power saving control does not contribute to the stable operation of power system 180, power saving control device 170 can determine that the power saving control is not to be performed. Thus, power saving control device 170 can avoid inappropriate execution of the power saving control.

(Seventh Aspect)

A power saving control method according to an aspect of the present invention includes an acquisition step (S101) and a control step (S102, S103).

In the acquisition step (S101), a power saving request is acquired. In the control step (S102, S103), it is determined whether or not power saving control for reducing the power consumption of a load device is to be performed in response to the power saving request, and when it is determined that the power saving control is to be performed, the power saving control is performed. In the control step (S102, S103), when load device 150 consumes power, it is determined that the power saving control is not to be performed under a condition that no power flows from power system 180 to facility 110 in which load device 150 is installed, the condition being one of one or more conditions.

Thus, when power flows from power system 180, it is possible to determine that the power saving control is to be performed, and when no power flows in from power system 180, it is possible to determine that the power saving control is not to be performed. Therefore; it is possible to avoid inappropriate execution of the power saving control. In addition, it is possible to reduce unnecessary obstruction to utilization of load device 150.

The invention claimed is:

1. A power saving control device comprising:
   an acquirer that acquires a power saving request; and
   a controller that determines whether or not power saving control for reducing a power consumption of a load device is to be performed in response to the power saving request, and that, when determining that the power saving control is to be performed, performs the power saving control,
   wherein when the load device consumes power, the controller determines that the power saving control is not to be performed under a condition that no power flows from a power system into a facility in which the load device is installed, the condition being one of one or more conditions.

2. The power saving control device according to claim 1, wherein when the load device consumes power, the controller determines that the power saving control is not to be performed under a condition that no power flows from the facility to the power system, the condition being one of the one or more conditions.

3. The power saving control device according to claim 1, wherein when the load device consumes power, the controller determines that the power saving control is not to be performed under a condition that a remaining amount of stored power of a power storage device for supplying power to the load device is not within a predetermined stored power remaining amount range, the condition being one of the one or more conditions.

4. The power saving control device according to claim 3, wherein when the power storage device is discharging, the predetermined stored power remaining amount range is a range from 0% to 10% of a capacity of the power storage device, and when the power storage device is charging, the predetermined stored power remaining amount range is a range from 90% to 100% of the capacity of the power storage device.

5. The power saving control device according to claim 1, wherein when the load device consumes power, the controller determines that the power saving control is not to be performed under a condition that a charge rate of the power storage device for supplying power to the load device is not within a predetermined charge rate range, the condition being one of the one or more conditions.

6. The power saving control device according to claim 5, wherein the predetermined charge rate range is a range from 90% to 100% of an upper limit of the charge rate.

7. A power saving control method comprising:
acquiring a power saving request; and
determining whether or not power saving control for reducing a power consumption of a load device is to be performed in response to the power saving request, and when it is determined that the power saving control is to be performed, performing the power saving control,
wherein in the determining, when the load device consumes power, it is determined that the power saving control is not to be performed under a condition that no power flows from a power system into a facility in which the load device is installed, the condition being one of one or more conditions.

* * * * *